(12) United States Patent
Spriggs et al.

(10) Patent No.: US 7,959,813 B2
(45) Date of Patent: Jun. 14, 2011

(54) CONTINUOUS FLUID TREATMENT SYSTEM AND METHOD

(75) Inventors: Harold Dennis Spriggs, Leesburg, VA (US); Amal M. El-Halwagi, College Station, TX (US)

(73) Assignee: Matrix Process Integration, Leesburg, VA (US)

( * ) Notice: Subject to any disclaimer, the term of this patent is extended or adjusted under 35 U.S.C. 154(b) by 445 days.

(21) Appl. No.: 12/065,422

(22) PCT Filed: Sep. 5, 2006

(86) PCT No.: PCT/US2006/034732
§ 371 (c)(1),
(2), (4) Date: Jul. 17, 2008

(87) PCT Pub. No.: WO2007/030551
PCT Pub. Date: Mar. 15, 2007

(65) Prior Publication Data
US 2008/0264866 A1    Oct. 30, 2008

Related U.S. Application Data

(60) Provisional application No. 60/715,106, filed on Sep. 7, 2005.

(51) Int. Cl.
*B01J 49/00* (2006.01)
*B01D 24/00* (2006.01)
(52) U.S. Cl. ......... 210/670; 210/675; 210/676; 210/269
(58) Field of Classification Search .................. 210/670, 210/675–676, 269
See application file for complete search history.

(56) References Cited

U.S. PATENT DOCUMENTS

| | | | |
|---|---|---|---|
| 3,607,740 A | 9/1971 | Akeroyd | |
| 3,745,114 A * | 7/1973 | Dixson | 210/675 |
| 4,228,001 A * | 10/1980 | Carlson | 210/676 |

* cited by examiner

*Primary Examiner* — Chester T Barry
(74) *Attorney, Agent, or Firm* — Merchant & Gould, P.C.

(57) ABSTRACT

Systems, apparatus and methods for treating a contaminated fluid stream are provided. The systems may include a treatment column fluidly interconnected to a regeneration column, the regeneration column being adapted to continuously receive solid spent media from the treatment column to continuously regenerate such solid spent media.

25 Claims, 7 Drawing Sheets

CONTINUOUS FLUID TREATMENT SYSTEM AND METHOD

CROSS-REFERENCE TO RELATED APPLICATION

This application claims priority to U.S. Provisional Patent Application No. 60/715,106 filed Sep. 7, 2005, entitled "Continuous Countercurrent Cascade Ion Exchange System for Treating Liquids", which is incorporated herein by reference in its entirety.

BACKGROUND OF THE INVENTION

Cost-efficient delivery of potable and/or industrially usable water is of growing importance. In many instances, potable water is shipped rather than treating non-potable water at the point of need due to treatment costs associated with the production of potable water. In turn, non-potable water at the point of need is often sent to disposal instead of being treated. For example, a substantial amount of water is generated and utilized in the production of crude oil and natural gas from subterranean formations. Such water (referred to in the industry as "produced water") contains a wide variety of contaminants, including emulsified and dissolved hydrocarbons, inorganic and organic sediments, well management chemicals and numerous salts, such as salts of sodium, calcium, chloride, fluoride, barium, magnesium, nitrate, nitrite, bicarbonate sulfate, iron, and sulfite. Thus, produced water generally contains very high amounts of contaminants and is rarely treated to produce potable or industrially usable water. Rather, produced water is generally injected back into the earth via a disposal well, or is treated as minimally as possible to permit disposal.

When it is desirable to treat water, either to generate potable or industrially usable water and/or to decontaminate water for discharge into the environment, ion exchange systems are often used. Ion exchange systems have long been known for removing impurities from fluids. For example, ion exchange systems are used to purify a liquid product, to remove contaminants from an effluent, a waste stream, or the like, or to treat a liquid to render it useful for a particular purpose, such as desalination of sea water for purposes of providing water for human consumption. Generally, an ion exchange resin is used in the ion exchange system, typically in the form of small beads, to adsorb contaminants in the fluid. The resin eventually is saturated with contaminants and is characterized as "spent." To minimize production costs, the resin is usually regenerated, generally by removing the resin from the system and treating it with one or more chemicals to remove the adsorbed material.

While effective, conventional ion exchange treatment systems have their downside. For example, regeneration of spent resin is typically carried out on a batch basis, during which fluid treatment and resin regeneration are carried out separately and in the same vessel. While batch procedures may be effective to remove the contaminants, batch processes suffer in that the flow of fluid to be treated must be stopped periodically in order to permit regeneration of the resin beads, effectively stopping fluid treatment. Furthermore, regeneration typically involves the consumption of large quantities of regenerants and, consequently, results in the discharge of large quantities of reject. Another drawback of conventional ion exchange systems is that pressurization may be required. Thus, there exists a need for improved ion-exchange systems, apparatus and methods.

SUMMARY OF THE INVENTION

In view of the foregoing, a broad objective of the present invention is to facilitate the continuous treatment of contaminated fluids using a solid media, such as an anionic or cationic resin.

A related objective is to facilitate the continuous regeneration of the solid media, thereby enabling the continuous treatment of the contaminated fluids using the solid media.

In addressing one or more of the above objectives, the present inventors have recognized that significant benefits may be realized from the use of a multi-zone fluid treatment system, the treatment system including a multi-zone regeneration column adapted to continuously regenerate solid media used in the treatment of a contaminated fluid, the regeneration column being configured to enable substantially unobstructed flow of the solid media through the column.

In one aspect of the invention, a system for continuously treating a contaminated fluid stream and for continuously regenerating a solid reactive media is provided, the system including a treatment column having at least a first treatment zone and a regeneration column having a plurality of treatment zones. The first treatment zone of the treatment column is used to continuously treat a polluted fluid with solid media. The plurality of treatment zones of the regeneration column are used to continuously regenerate and rinse the solid media (e.g., regenerate in a first zone and rinse in a second zone) so that the solid media may be continuously returned to the treatment column to facilitate the continuous, uninterrupted treatment of the contaminated fluid.

In one approach, the treatment column is operable to continuously flow solid reactive media (e.g., ion exchange resin) therethrough to treat a contaminated fluid stream, and the regeneration column is adapted to continuously receive solid spent media (e.g., spent ion exchange resin) from the treatment column. In this regard, the treatment column generally includes a solid reactive media inlet, where solid reactive media may enter the treatment column, and a solid spent media outlet, where solid spent media (i.e., solid reactive media that has flowed through the column and interacted with fluids contained therein) may exit the treatment column. The regeneration column generally includes a solid spent media inlet, for receiving the solid spent media from the treatment column, and a solid reactive media outlet, where treated solid spent media (i.e., the solid reactive media) may exit the regeneration column for return to the treatment column.

The regeneration column generally comprises at least two zones for regenerating the solid spent media. In one approach, the regeneration column comprises a first zone, where solid spent media is contacted by a regeneration fluid to remove contaminants adsorbed thereon, thereby create solid regenerated media, and a second zone, where the solid regenerated media is contacted by a rinsing fluid to rinse the solid regenerated media, thereby producing the solid reactive media. In this regard, the regeneration column generally includes at least one regeneration fluid inlet, at least one regeneration fluid outlet and at least one rinsing fluid inlet. In one embodiment, the regeneration column includes at least one rinsing fluid outlet, wherein rinsing fluid may exit the regeneration column. In another embodiment, the regeneration column is free of a rinsing fluid outlet, and thus the supplied rinsing fluid may be utilized to dilute incoming regeneration fluid for use in the regenerating zone of the regeneration column.

In a particular approach, the regeneration column is configured to facilitate the substantially unobstructed flow of solid media through the at least two zones of the regeneration column. For example, a flow differential between the rinsing fluid and the regeneration fluid may be utilized to separate one zone from another zone without the use of physical barriers. In this regard, one or more sensor(s) may be interconnected to the regeneration column for sensing a condition of fluid proximal the sensor(s). In one embodiment, the sensor(s) are operable to sense at least one of a pH, an electroconductivity, and a concentration of fluid proximal the sensor(s). The sensor(s) may be interconnected to a controller and operable to provide signals corresponding with the sensed condition(s) to the controller. The controller may be operable to receive these signals and determine an appropriate control response. In one embodiment, the controller may be interconnected to one or more flow rate adjuster(s) and operable to provide control signals to the flow rate adjuster(s) in view of the determined control response. The flow rate adjuster(s) may be fluidly interconnected to one or more of the fluid inlets and outlets of the regeneration column (e.g., a rinsing fluid outlet). The flow rate adjuster(s) may be operable to receive the control signals from the controller to adjust the flow of fluid into and/or out of the regeneration column, thereby facilitating the flow differential between the regeneration fluid and the rinsing fluid, and hence the separation of the two zones in the regeneration column without the use of physical barrier. Thus, solid media may flow substantially unobstructed through at least two zones of the regeneration column. Sensor(s) may be used on one or more of the inlets and/or outlets of the regeneration column to further facilitate control of the flow of fluids into and out of the regeneration column, thereby assisting in maintaining separate zones in the regeneration column and unobstructed flow of solid media through the column.

In a related embodiment, a regeneration fluid supply may be interconnected to a regeneration fluid inlet of the regeneration column, and a rinsing fluid supply may be interconnected to a rinsing fluid inlet of the regeneration column. The regeneration fluid supply may be operable to supply regeneration fluid at one or more flow rates, and the rinsing fluid supply may be operable to supply rinsing fluid at one or more other flow rates. The regeneration fluid supply rate and the rinsing fluid supply rate may thus be controlled to facilitate a flow differential between the regeneration fluid and rinsing fluid in the regeneration column. This flow rate differential may be such that the regeneration fluid of the first zone and the rinsing fluid of the second zone are restricted from substantially mixing.

In one approach, the regeneration column may be configured to facilitate the countercurrent flow of solid media relative to the fluids of the regeneration column. For example, the regeneration column may be oriented such that, during operation of the system, solid reactive media entering the regeneration column will flow from the solid spent media inlet downwards toward the solid reactive media outlet. The regeneration column may also be oriented such that regeneration fluid entering the regeneration column will flow upward from the regeneration fluid inlet toward the regeneration fluid outlet, and rinsing fluid entering the regeneration column will flow upwards from the rinsing fluid inlet toward the rinsing fluid outlet and/or the regeneration liquid inlet. In one embodiment, the regeneration column is substantially vertically oriented and a series of pumps may be used to pump liquids into the column to facilitate the upward flow of the liquids.

In one embodiment, the regeneration column may include a regeneration fluid outlet, a regeneration fluid inlet located below the regeneration fluid outlet, a rinsing fluid outlet below the regeneration fluid inlet and a rinsing fluid inlet below the rinsing fluid outlet. The regeneration column may include a solid spent media inlet located above the regeneration fluid inlet and a solid reactive media outlet located below the solid spent media inlet. Thus, solid spent media entering the regeneration column via the solid spent media inlet may thus flow downward (e.g., via gravity flow) toward the solid reactive media outlet, and thus countercurrent to fluids being provided to the regeneration column. In a particular embodiment, a top portion of the regeneration column may be open to the surrounding atmosphere, the open top portion being adapted to receive the solid spent media from a solid spent media source. Hence, the regeneration column may be operable at about atmospheric pressure and with countercurrent flow of the solid media relative to the fluids of the regeneration column.

In another aspect, methods of continuously treating a contaminated fluid stream while continuously regenerating a solid reactive media used in the treatment of the contaminated fluid stream are provided. The methods may include the step of flowing, in a first treatment zone (e.g., a treatment column), a contaminated fluid stream countercurrent or concurrent to the flow of a stream of solid reactive media, thereby producing solid spent media. The methods may include the step of flowing, in a second treatment zone (e.g., a first zone of a regeneration column), a regeneration fluid countercurrent or concurrent to the flow of a stream of the solid spent media, thereby producing solid regenerated media. The methods may include the step of flowing, in a third treatment zone (e.g., a second zone of a regeneration column), a rinsing fluid countercurrent or concurrent to the flow of a stream of solid regenerated media, thereby producing the solid reactive media. The methods may include the step of returning the solid reactive media to the first treatment zone.

In one approach relating to these methods, the second treatment zone and the third treatment zones may be contained in a single regeneration column, and the second treatment zone may be separated from the third treatment zone without the use of physical barriers interconnected to the regeneration column. For example, a flow rate differential between the regeneration fluid and the rinsing fluid, as previously described, may be used. In this regard, the methods may include one or more of the steps of monitoring a condition of a fluid proximal the second treatment zone and the third treatment zone, and/or completing a predetermined action in response to the monitoring step. For example, when the monitored condition is not in accordance with a predetermined control parameter, the completing step may comprise changing at least one of a flow rate associated with the regeneration fluid (e.g., a regeneration fluid inlet flow rate and/or a spent regeneration fluid outlet flow rate), a flow rate associated with the rinsing fluid (e.g., a rinsing fluid inlet flow rate and/or a rinsing fluid outlet flow rate), and combinations thereof. When the monitored condition is in accordance with a predetermined control parameter, the completing step may comprise maintaining the flow rates of the fluids. In one embodiment, the monitored condition is at least one of a pH, an electroconductivity and a concentration. The first, second, third and/or other treatment zones may be contained in separate columns, or two or more of the zones may be contained in a single column (e.g., a first zone in a first column and a second and third zone in a second column), the plurality of zones in the single column being separable by the methods previously described. In a particular embodiment, all three of the above-described zones may be included in a single column, the zones being separable by the methods previously described.

In one embodiment, one of more of the flowing steps includes flowing, via gravity, the solid media downwardly through a treatment zone. One or more of the flowing steps may include upwardly flowing the regeneration fluid through a treatment zone. Thus, the methods may include countercurrently flowing solid media relative to fluids in any of the treatment zones. Any of the flowing steps may be completed contemporaneously and/or continuously to effect contemporaneous and continuous treatment of contaminated fluids and contemporaneous and continuous reproduction of the solid reactive media.

The methods may also include the steps of operating one or more columns containing the treatment zones at about atmospheric pressure. In this regard, one or more columns may include a partially open top portion adapted to receive solid media. The methods may include the step of dumping solid media into the open top portion of the column(s).

In one approach, the solid spent media removed from the first treatment zone may be in a slurry form with fluid of the first treatment zone. The methods may include the steps of separating the fluid of the slurry from the solid spent media and returning the separated fluid to the first treatment zone. The methods may include the step of providing the separated solid spent media to the second treatment zone. This approach facilitates the maintenance of a fluid balance within the treatment zones, wherein fluids from the first treatment zone may be restricted from entering the second or third treatment zones.

These and various other features as well as advantages which characterize the present invention will be apparent from a reading of the following detailed description and a review of the associated drawings.

DETAILED DESCRIPTION

Reference will now be made in detail to the accompanying drawings, which at least assist in illustrating various pertinent embodiments of the present invention.

Figure 1:
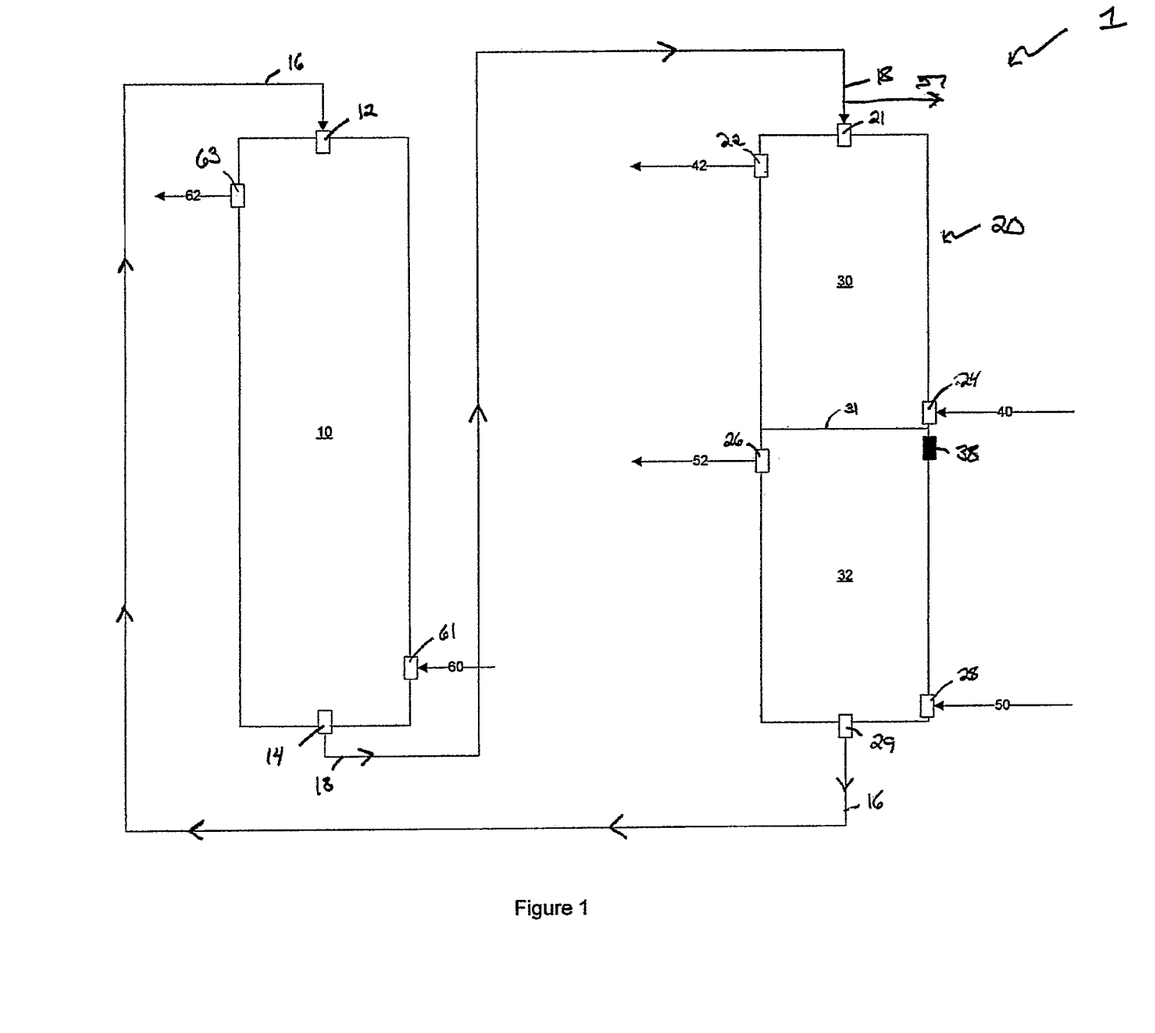
FIG. 1 is a schematic view of one embodiment of a continuous fluid treatment system in accordance with the present invention.

Referring now to FIG. 1, one embodiment of a fluid treatment system is illustrated. The system 1 comprises a treatment column 10 and a regeneration column 20. The treatment column 10 is operable to continuously flow solid reactive media 16 therethrough to treat a contaminated fluid 60. Generally, the solid reactive media 16 enters the treatment column 10 via solid reactive media inlet 12, where it flows through treatment column 10 (e.g., via gravity) and contacts fluids contained therein. As the solid reactive media 16 flows through the treatment column 10, it adsorbs contaminants contained in the fluid, thereby "treating" the liquid to produce treated water 62. The solid reactive media 16 exits the treatment column 10 as solid spent media 18 via solid spent media outlet 14.

After exiting the treatment column 10, the solid spent media 18 is provided to the regeneration column 20 for regeneration. The solid spent media 18 enters the regeneration column 20 via solid spent media inlet 21 and flows through a first zone 30 and a second zone 32 of the regeneration column 20 (e.g., via gravity). In the first zone 30, the solid spent media 18 contacts a regeneration fluid 40 (e.g., an acidic solution) where contaminants that were adsorbed by the solid media in the treatment column 10 are leached into the regeneration fluid 40, thereby removing at least some of (e.g., a majority of) the contaminants from the solid media. The solid spent media 18 exits the first zone 30 of the regeneration column as solid regenerated media (not shown).

In the second zone 32 of the regeneration column 20, the solid regenerated media contacts a rinsing fluid 50 (e.g., an aqueous solution) where residual regeneration fluid and/or contaminants are rinsed/removed from the solid regenerated media and transferred to the rinsing fluid 50. The solid regenerated media exits the second zone 32 of the treatment column 20 as solid reactive media 16 via solid reactive media outlet 29. The solid active reactive media 16 may then be returned to and utilized in the treatment column 10, as described above.

In most instances, the contaminated fluid 60, the regeneration fluid 40, and the rinsing fluid 40 will comprise a liquid, and in some instances one or more of these fluids will consist essentially of a liquid. Thus, for the purposes of illustration, these fluids are hereinafter referred to as a liquid, liquids and the like, and their associated inlets and outlets as liquid inlets and liquid outlets. However, in certain embodiments, it is anticipated that gases may make up a substantial portion of one or more of the contaminated fluid 60, the regeneration fluid 40, and/or the rinsing fluid 40, and in certain instances one or more of these fluids may consist essentially of a gas. Hence, the use herein of the term liquid, liquids and the like, is not to be construed as limiting the invention to the liquid phase.

The treatment column 10 comprises a solid reactive media inlet 12 and a solid spent media outlet 14, as previously described. The treatment column 10 further comprises a contaminated liquid inlet 61, where contaminated liquid 60 may be injected, and a treated liquid outlet 63, where treated liquid 62 exits the treatment column 10. The solid reactive media inlet 12 and contaminated liquid inlet 61 are generally interconnected to the treatment column to facilitate the countercurrent flow of solid reactive media 16 relative to the contaminated liquid 60. For example, the solid reactive media inlet 12 may be disposed above the contaminated liquid inlet 61, as illustrated. In another embodiment, the solid reactive media inlet 12 may be disposed adjacent the treated liquid outlet 63, such as in an overflow configuration, described in further detail below. In either embodiment, the solid reactive media 16 may flow countercurrent to the flow of the contaminated liquid and solid spent media 18 may be continuously output from the treatment column 10.

The regeneration column 20 is adapted to continuously receive the solid spent media 18 from the treatment column 10 and to continuously output solid reactive media 16. In this regard, the regeneration column 20 generally includes the previously mentioned solid spent media inlet 21 and solid reactive media outlet 29. The solid spent media inlet 21 is generally interconnectable to the solid spent media outlet 14 of the treatment column 10 (e.g., via suitable piping/pumps/hoppers). The solid reactive media outlet 29 is generally interconnectable to the solid reactive media inlet 16 of the treatment column 10 (e.g., via suitable piping/pumps/hoppers).

The regeneration column 20 also includes a regeneration liquid inlet 24, a regeneration liquid outlet 22, and a rinsing liquid inlet 28. The regeneration column 20 may also include a rinsing liquid outlet 26, as illustrated. For example and in one embodiment, rinsing liquid 50 may enter the regeneration column via rinsing liquid inlet 28 and exit via rinsing liquid outlet 26. In another embodiment, the regeneration column 20 may be free of a rinsing liquid outlet, wherein rinsing liquid is provided to the first zone 30 of the regeneration column 20 to assist in diluting the regeneration liquid 50 entering the regeneration column 20.

In a particular embodiment, the regeneration liquid inlet 24 is disposed below the regeneration liquid outlet 22, the rinsing liquid outlet 26 is disposed below the regeneration liquid inlet 24, and the rinsing liquid inlet 28 is disposed below the rinsing liquid outlet 26. In this embodiment, the solid spent media inlet 21 may be disposed above the regeneration liquid inlet 24 and the solid reactive media outlet 29 may be disposed below the solid spent media inlet 21. This arrangement of inlets and outlets facilitates the approximation of countercurrent flow of solid media through the regeneration column 20 relative to the flow of liquids in the first and second zones 30, 32.

One notable feature of the present embodiment is that physical barriers are not utilized to restrict liquid in the first zone 30 from flowing into the second zone 32. Rather, a differential between the flow rate of the regeneration liquid and rinsing liquid is utilized. In general, the differential between the flow rate of the regeneration liquid 40 entering first zone 30 and the flow rate of spent rinsing liquid 52 exiting the second zone 32 is such that regeneration liquid 40 is restricted from entering the second zone 32 and spent rinsing liquid 52 is restricted from entering the first zone 30, as illustrated by imaginary zone separation line 31. In a particular embodiment, the flows of the regeneration liquid 40 and the rinsing liquid 50 may be set independently and the flow of the spent rinsing liquid 52 may be controlled to restrict regeneration liquid from flowing down the regeneration column 20 through imaginary zone separation line 31. One or more sensors may be utilized to measure the condition of the liquids proximal the imaginary zone separation line 31 to change an appropriate operation parameter to maintain the separate zones, as discussed in further detail below. Thus, solid media may flow substantially unobstructed through at least two distinct treatment zones of the regeneration column 20. Such a configuration is desirable as reduces the amount of materials and moving parts required to operate the regeneration column 20 and facilitates continuous operation of the regeneration column 20. Therefore, the solid media (i.e., solid reactive media, solid spent media, and/or solid regenerated media) may be continuously circulated through the system 1, and the system 1 may be operated on a continuous basis, as opposed to batch reactor configurations known hitherto.

To facilitate the appropriate flow differential between the regeneration liquid and the rinsing liquid, one or more sensors 38 ("sensor(s)") may disposed proximal the first and second zones 30, 32. The sensor(s) 38 may be operable to sense a condition of liquid proximal the sensor(s) 38. For example, the sensor(s) 38 may be operable to sense one or more of a pH and/or electroconductivity and/or a concentration of liquid proximal the sensor(s) 38. A controller (not illustrated) may be interconnected to the sensor(s) 38 for receiving signals therefrom. Thus, when liquid proximal the sensor(s) 38 is sensed to have a condition that is not in accordance with a predetermined setting, the controller may adjust one or more parameters associated with the rinsing liquid and/or regeneration liquid in an effort to maintain the desired flow rate differential. For example, the controller, which may comprise a computer system having appropriate hardware and software, may adjust a flow rate of one of the incoming liquids 40, 50 and/or exiting liquids 42, 52. Sensor(s) 38 may also be used proximal the inlets and/or outlets of the various liquid streams of the regeneration column 20 for determining inlet and outlet conditions of those liquids.

Various solid reactive media 16 are available for treatment of liquids, and the appropriate solid reactive media 16 may be selected in accordance with the contaminant type and/or liquid type being treated. In this regard, any suitable solid media adapted to adsorb contaminants from a liquid stream may be utilized. One particularly useful solid media is an anionic or cationic ion exchange resin, which is useful in treating a variety of liquid streams, including contaminated water. Ion exchange resins are useful in that spent resin exiting the treatment column 10 may be transferred directly to the regeneration column 20 without additional treatment, thereby enhancing throughput. The ion exchange resin may be in any suitable form, such as a particulate or bead form. Other useful solid media include activated carbons.

In one embodiment, the solid spent media 18 exiting the treatment column 10 may be in slurry form and include small amounts of liquid. To maintain efficient operation of the system 1, most or all of the liquid in the slurry should be separated from the solid spent media 18 prior to supplying the solid spent media 18 to the regeneration column 20, and thus the removed liquid should be returned to the treatment column 10. This separation generally occurs at the solid spent media inlet 21 of the regeneration column, as indicated by recovery stream 57, but the separation may be accomplished at other locations. The recovery stream should be returned to treatment column 10 to maintain fluid balance within the system.

Figure 2:
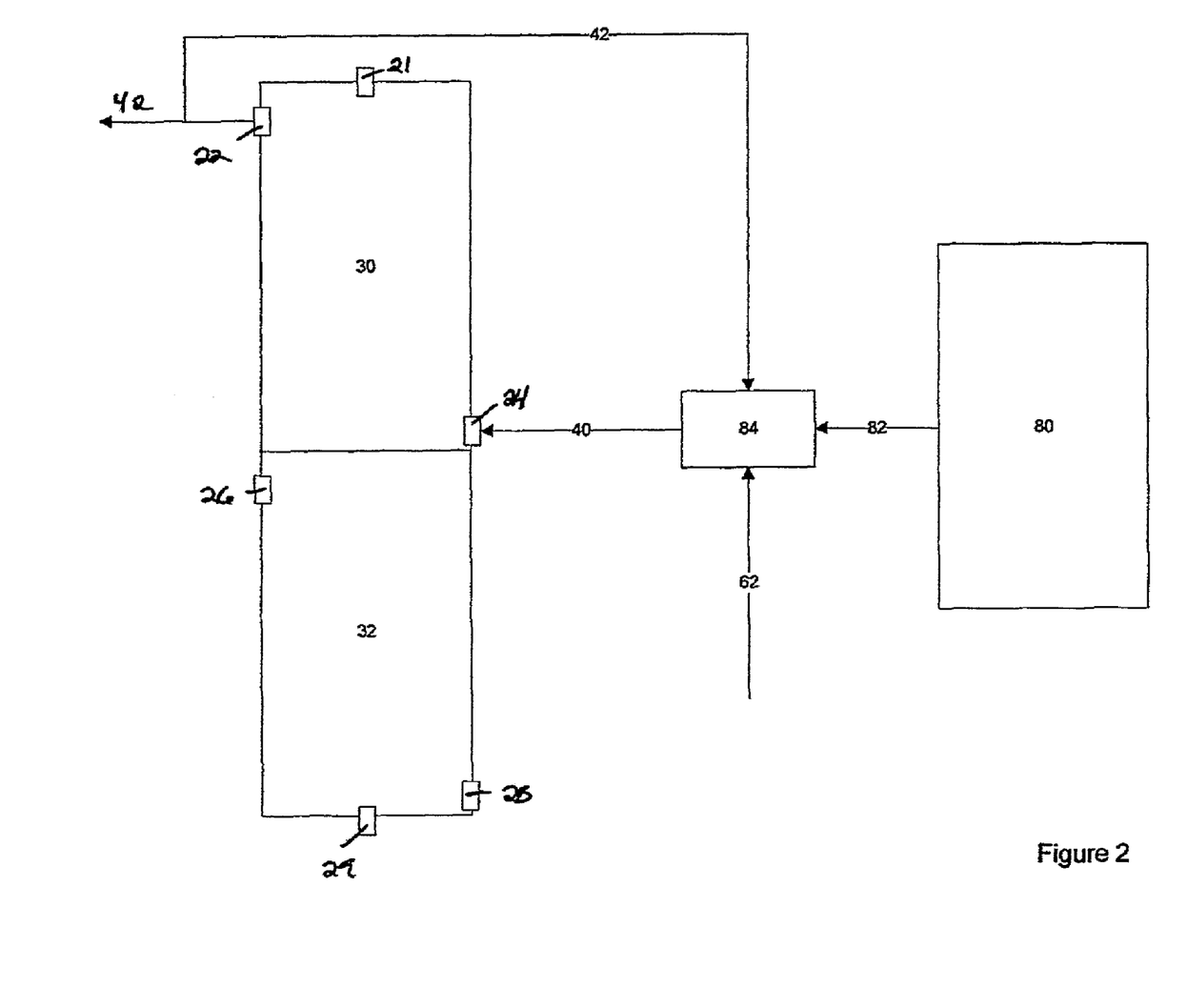
FIG. 2 is a schematic view of one embodiment of a regeneration fluid supply configuration.

The regeneration liquid 40 generally comprises a liquid adapted to regenerate the solid spent media 18 via removal of contaminants adsorbed thereon. For example, the regeneration liquid may comprise an acidic solution. Acids useful in regenerating ion exchange resins include HCl and $H_2SO_4$. The concentration of the regeneration liquid entering the regeneration column is selected to comply with the requirements of the ion exchange resin being used, which varies from resin to resin. In most instances, the pH is less than 7. The regeneration liquid 40 may be supplied from any source, such as a regeneration tank. One useful regeneration liquid supply configuration is schematically illustrated in FIG. 2. A regeneration liquid supply tank 80 is interconnected to and supplies regeneration liquid 40 to the regeneration column 20 via regeneration liquid inlet 24. The supply tank 80 may house a concentrated liquid 82 (e.g., a concentrated acid, such as 36% HCl), which may be diluted before being supplied to the regeneration column 20 (e.g., to avoid damaging of spent reactive media 18). In this regard, one or more liquids may be combined with the concentrated liquid 82 (e.g., via mixer 84) upstream of regeneration liquid inlet 24 to dilute the concentrated liquid 82 and produce the regeneration liquid 40 (e.g., a 10% HCl solution). By way of primary example, a portion of the treated liquid 62 may be mixed with the concentrated liquid 82 to produce the regeneration liquid 40.

By way of secondary example, a portion of the spent regeneration liquid 42 may be recycled and recombined with the concentrated liquid 82 to produce the regeneration liquid 40. Recycling of the spent regenerated liquid 42 (e.g., brine) allows for efficient regeneration liquid management. As may be appreciated, the theoretical maximum spent regeneration liquid concentration is limited by the solubility limit of the contaminants in the fluid streams.

By way of a third example, a portion of the spent rinsing liquid 52 may be recycled and combined with the concentrated liquid 82. This may be accomplished external to the regeneration column 20, as illustrated in FIG. 2, or may be accomplished by allowing spent rinsing liquid to flow directly from second zone 32 into first zone 30, without removal from the regeneration column 20, as described above.

As may be appreciated, different concentrations of regeneration liquid 40 may be required based on the type of solid media utilized in the system and the desired residence time in the regeneration zone 30. In this regard, the regeneration liquid supply tank 80 and corresponding liquid flow rates may be tailored to achieve such concentrations and residence times.

Referring back to FIG. 1, the rinsing liquid 50 may be any liquid adapted to rinse the solid media. For example, the rinsing liquid 50 may comprise water, such as de-ionized water or other suitable water. In one embodiment, the rinsing liquid 50 may comprise a portion of the treated liquid 62. For example, a portion or all of the treated liquid may be provided as the rinsing liquid 40 and/or may be combined with a regeneration liquid source stream. In another embodiment, a secondary water source (not illustrated) may be used, such as a secondary non-potable water source.

The contaminated liquid 60 may be any liquid suitable for treatment by the solid reactive media 16. In one embodiment, the contaminated liquid may comprise contaminated water, such as "produced water" obtained from coal, natural gas and/or hydrocarbon production. Contaminated liquid 60 may be supplied and treated liquid 62 may be removed from the treatment column 10 via various configurations. For example, the contaminated liquid 60 may be injected proximal the bottom of the treatment column 10 and the treated liquid 62 may be removed proximal the top of the treatment column 10. In one embodiment, the treated liquid 62 is removed from the treatment column 10 at a point above the inlet of the solid reactive media 16, such as via an overflow configuration, described below. In an alternative embodiment, a pump may be used to actively remove the treated liquid 62 in order to maintain a predetermined height of liquid in the treatment column 10. The treated liquid 62 may comprise water, which may require further treatment after removal from the treatment column 10. For example, the treated water may have a relatively low pH, and thus may be treated with a basic solution to achieve a more neutral pH.

One or more of the incoming liquid streams may have various entrained solids and gases. Thus, the incoming liquid streams (e.g., contaminated liquid 60, regeneration liquid 40, and/or rinsing liquid 30) may require filtration, degasification and/or treatment with ozone prior to injection into the column(s). For example, a sand filtration system may be utilized to filter sediments and gels from contaminated liquid 60. A degasification system such as a heated expansion chamber (not illustrated) may be utilized to remove dissolved gases (e.g., $CO_2$ and/or methane) from any of the contaminated liquid 60, regeneration liquid 40 and/or rinsing liquid 50 streams, thus preventing bubble formation in the treatment column 10 and the regeneration column 20. An ozone treatment system may also be used to kill bacteria in the liquids and/or to oxidize heavy metals.

Movement of the materials to and through the columns 10, 20 may be effected by any suitable apparatus and method. In one embodiment, pumps are used to effect flow of various materials through the columns 10, 20. For example, a pump may be used to transfer solid spent media 18 from the treatment column 10 to the regeneration column 20. Another pump may be used to transfer treated liquid 62 to one or more locations, such as to a secondary treatment facility, or to a rinsing liquid supply (not illustrated) or the mixer 84 of FIG. 2 (e.g., an agitator, a mixing tank). Yet another pump may be used to transfer spent regeneration liquid 42 to a disposal location or for recombination with regeneration liquid 40. Still another pump may be used to transfer solid reactive media 16 from the regeneration column 20 to the treatment column 10. Depending on the application, more or fewer pumps can be used. The pumps can be of any appropriate type for moving the material involved. For example, a progressive cavity slurry pump may be used to transfer solid media and slurries containing the same.

The treatment column 10 may be of any orientation, but it is generally desired that the treatment column 10 be of a vertical orientation to facilitate gravity flow of solid media through the treatment column 10. Such a vertical orientation also facilitates operation of the treatment column 10 at about atmospheric pressure, wherein a top portion of the treatment column 10 may be open for ready receipt of solid reactive media 16, such as via a hopper, or the like. Thus, the treatment column 10 may be operated without use of elevated pressure. The treatment column 10 may alternatively be substantially enclosed to prevent foreign material from entering the treatment column 10.

The treatment column 10 may be sized and solid media flow rates and liquid flow rates may be tailored in accordance with one or more design parameters (e.g., in accordance with the flow of the contaminated liquid being treated; to meet a desired residence time; design requirements of the solid media). For example, the treatment column 10 may be sized and solid media flow rates and liquid flow rates may be tailored so that the quality of the treated liquid 62 exiting the treatment column 10 is in accordance with a desired standard. Moreover, the treatment column 10 may be designed with baffles and contacting plates to permit flow of the solid reactive media 16 through the column while minimizing dead spots and flow choke points that may cause clogging of the treatment column 10. Thus, the treatment column 10 may be designed to meet different treatment requirements.

The treatment column 10 may be interconnected to any number of sensors and valves to facilitate operation of the system 1. Those sensors and valves may be interconnected to a controller to further facilitate operation of the system 1. For example, an electroconductivity sensor, a pH sensor, and/or a flow meter, may be disposed proximal the contaminated liquid inlet 61 and/or the treated liquid outlet 63. One or more of those sensors may also be disposed proximal the spent media outlet.

Figure 3A:
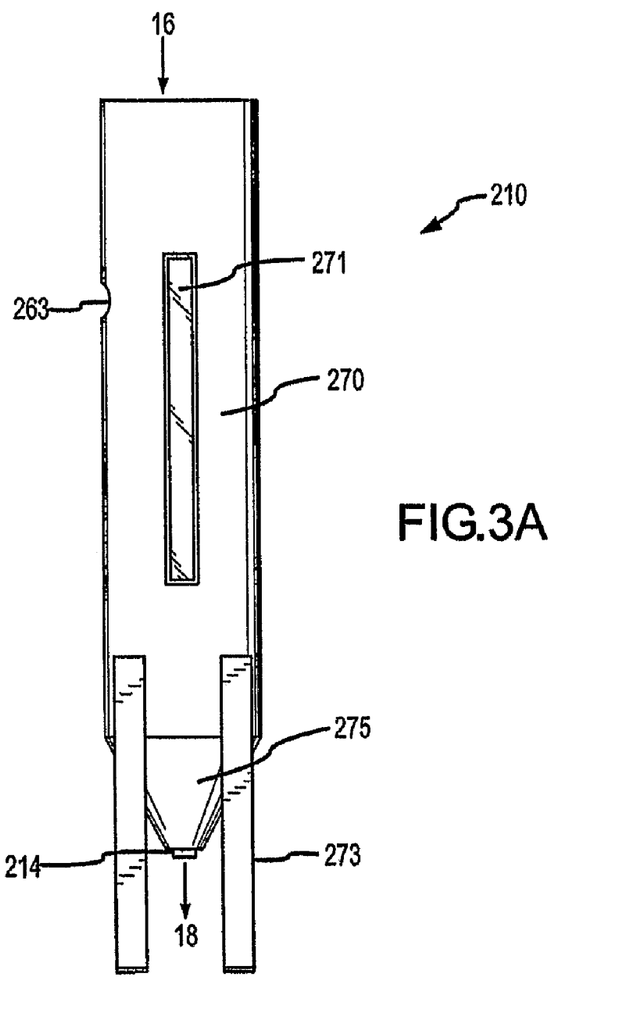
FIG. 3A is a schematic view of one embodiment of a treatment column.

One embodiment of a treatment column useful in conjunction with the present invention is illustrated in FIG. 3A. The treatment column 210 includes an upper portion 270 and a lower portion 275. In the illustrated embodiment, the upper portion 270 comprises a tubular shape and the bottom portion 275 comprises a cone-like shape interconnected to the upper portion 270. The upper portion 270 includes a translucent or transparent viewing panel 271 for viewing an internal portion of the treatment column 210 (e.g., to assess the operating status of the column). Legs 273 may be utilized to maintain the treatment column 210 in a substantially vertical orientation.

Operation of the treatment column 210 is similar to the operation of treatment column 10, described above with reference to FIG. 1. Solid reactive media 16 enters treatment column 210 near the top of upper portion 270, which may be open to the atmosphere. The solid reactive media 16 flows through the treatment column 210 and exits the treatment column 210 as solid spent media 18 via port 214 in bottom portion 275. Contaminated liquid (not illustrated) is injected proximal the bottom of the upper portion 270 and treated liquid (not illustrated) exits treatment column 210 via port 263. Thus, countercurrent flow of the solid media and liquid is achieved.

Figure 3B:
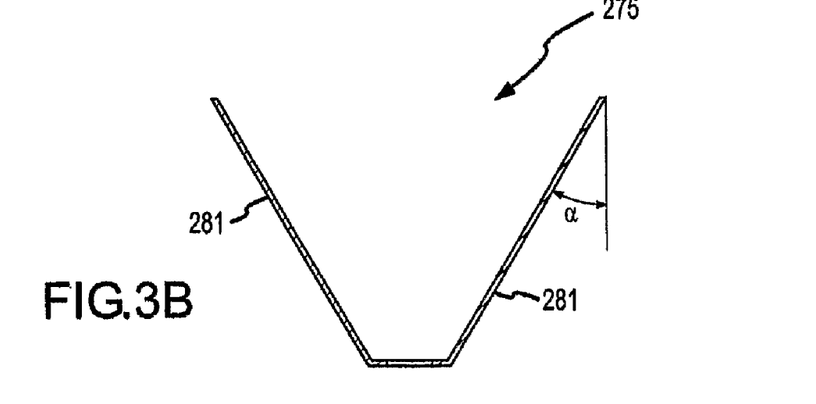
FIG. 3B is a cross-sectional view of one embodiment of a lower portion of the treatment column of FIG. 3A.

The bottom portion 275 of the treatment column 210 may be of any configuration that facilitates removal of the solid spent media 18 from the treatment column 210. For example, and with reference to FIG. 3B, the bottom portion 275 may comprise a cone-like shape adapted to funnel solid spent media 18 towards port 214. In this regard, the sides 281 of the bottom portion 275 may be transverse relative to the sides of the upper portion 270, as illustrated by angle "α" in FIG. 3. Generally, angle α is of a magnitude that facilitates flow of solid spent media 18 toward port 214, such as an angle of at least about 5° and not greater than about 45° (e.g., an angle of 30°).

Figure 4:
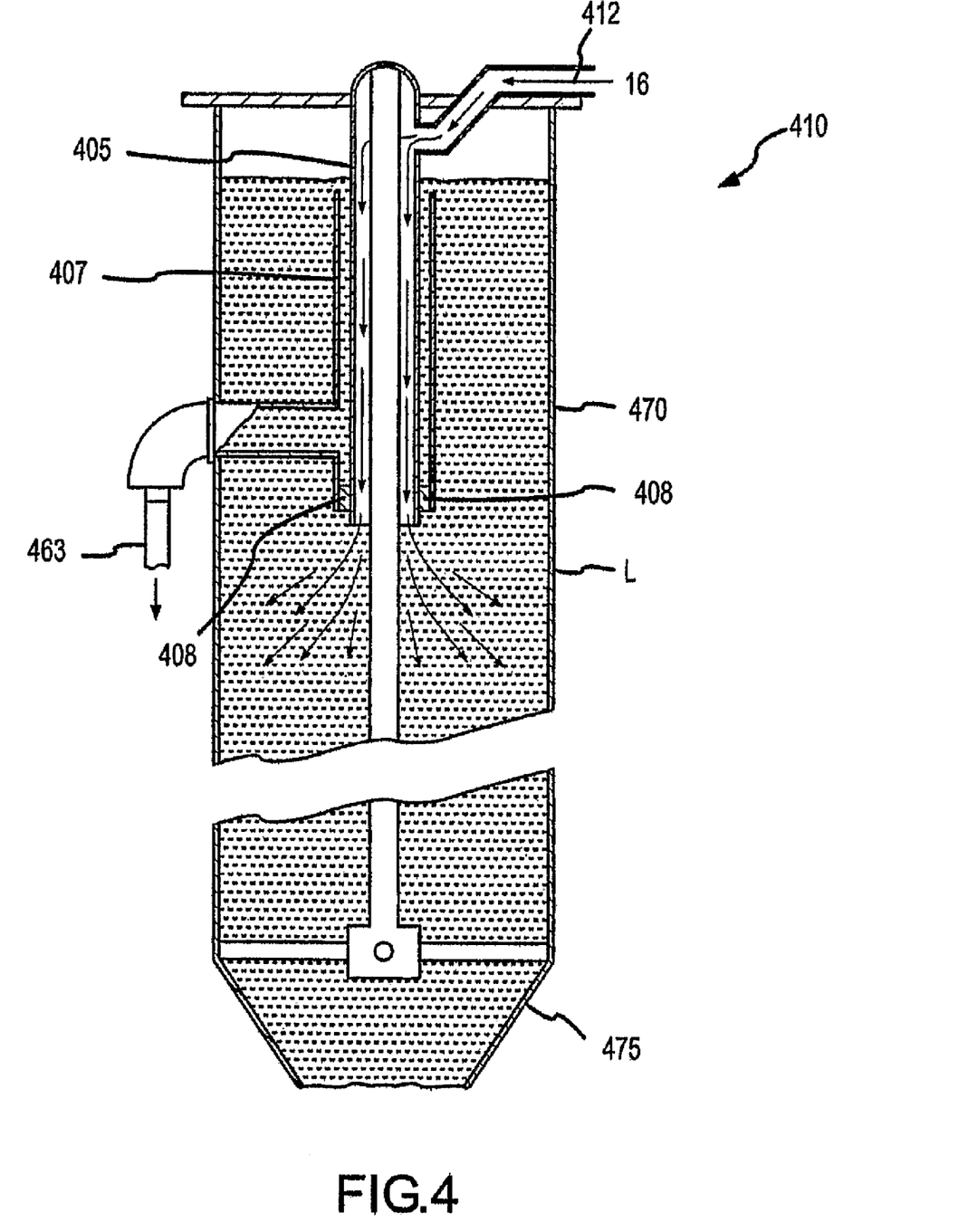
FIG. 4 is a cross-sectional, schematic view of one embodiment of a treatment column.

Another useful treatment column is illustrated in FIG. 4, which illustrates an overflow treatment column configuration. The treatment column 410 comprises an upper portion 470 and a lower portion 475, similar to those described above with reference to FIG. 2. Disposed within the upper portion 470 is a solid media supply pipe 405 interconnecting a solid reactive media inlet 412 to an internal portion of the treatment column 410. The treatment column 410 also includes an overflow pipe 407 surrounding the supply pipe 405. The inside surface of the overflow pipe 407 and the outside surface of the supply pipe 405 are spaced from one another thereby creating a gap, which liquid L may flow through to reach treated liquid outlet 463. The overflow pipe 407 also includes stoppers 408 disposed proximal the bottom of overflow pipe 407 and an open top to allow water to enter overflow pipe 407 and exit via treated liquid outlet 463. A contaminated liquid inlet (not illustrated) is interconnected to the treatment column 410 to allow entry of contaminated liquid into treatment column 410. Solid reactive media 16 enters treatment column 410 via solid reactive media inlet 412 and flows towards the bottom portion 475 of treatment column 410 via supply pipe 405. In operation, contaminated liquid (not illustrated) is injected proximal the bottom of first portion 470 of treatment column 410. This liquid flows upward (e.g., via pumping force) towards the top of first portion 470 of treatment column 410 and enters the open top of overflow pipe 407 upon attaining a predetermined height within the treatment column 410. Liquid attaining this height thus flows out of treatment column 410 via overflow pipe 407 and treated liquid outlet 463. A screen or similar apparatus may be interconnected to the overflow pipe 407 to restrict the solid reactive media 16 from entering the overflow pipe 407. Solid reactive media 16 enters treatment column 410 via solid reactive media inlet 412 and flows, via supply pipe 405, downwards into treatment column 410. Solid reactive media 16 exits pipe 405 and enters the liquid-filled portion of the treatment column 410. The solid reactive media 16 then flows downward towards the second portion 475 of treatment column 410 contacting the liquid L and adsorbing contaminants contained therein, as previously described. Solid media exits treatment column 410 as solid spent media 18 (not illustrated) and may be subsequently provided to regeneration column 20, as previously described. As noted previously, the sold media exiting the treatment column 20 may include some liquid, and this liquid may be separated from the solid media and returned to the treatment column (e.g., to maintain a fluid balance within the system). Referring back to FIG. 1, the regeneration column 20 may be of any orientation, but it is generally desired that the regeneration column 20 be of a vertical orientation to facilitate gravity flow of solid media through the regeneration column 20. Such a vertical orientation also facilitates operation of the regeneration column 20 at about atmospheric pressure, wherein a top portion of the regeneration column 20 may be open to facilitate receipt of solid spent media 18, such as via a hopper, or the like. Thus, the regeneration column 20 may be operated without the use of elevated pressure. The regeneration column 20 may alternatively be substantially enclosed to prevent foreign material from entering the regeneration column 20.

The regeneration column 20 may be sized and solid media flow rates and liquid flow rates may be tailored in accordance with one or more design parameters (e.g., in accordance with the flow of the contaminated liquid being treated; to meet a desired residence time; design requirements of the solid media). For example, the regeneration column 20 may be sized and solid media flow rates and liquid flow rates may be tailored to facilitate regeneration of the solid spent media 18 to solid reactive media 16 with reduced residence time. The residence time of solid media in the first and second zones 30, 32 may also/alternatively be tailored in accordance with a desired flow rate of solid media through the regeneration column 20.

The regeneration column 20 may include any number of regeneration liquid inlets 24, regeneration liquid outlets 22, rinsing liquid inlets 28 and rinsing liquid outlets 26 to supply liquids to their respective zones 30, 32. Likewise, a plurality of treatment zones may be used in the regeneration column 20 and each of these zones may include one or more liquid inlets and liquid outlets.

The regeneration column 20 may be interconnected to any number of sensors and valves to facilitate operation of the system 1. Those sensors and valves may be interconnected to a controller to further facilitate operation of the system 1. For example, an electroconductivity sensor, a pH sensor, and/or a flow meter, may be disposed proximal any of the liquid inlets 24, 28 and/or the liquid outlets 22, 26. One or more of those sensors may also be disposed proximal the solid reactive media outlet 29.

Figure 5:
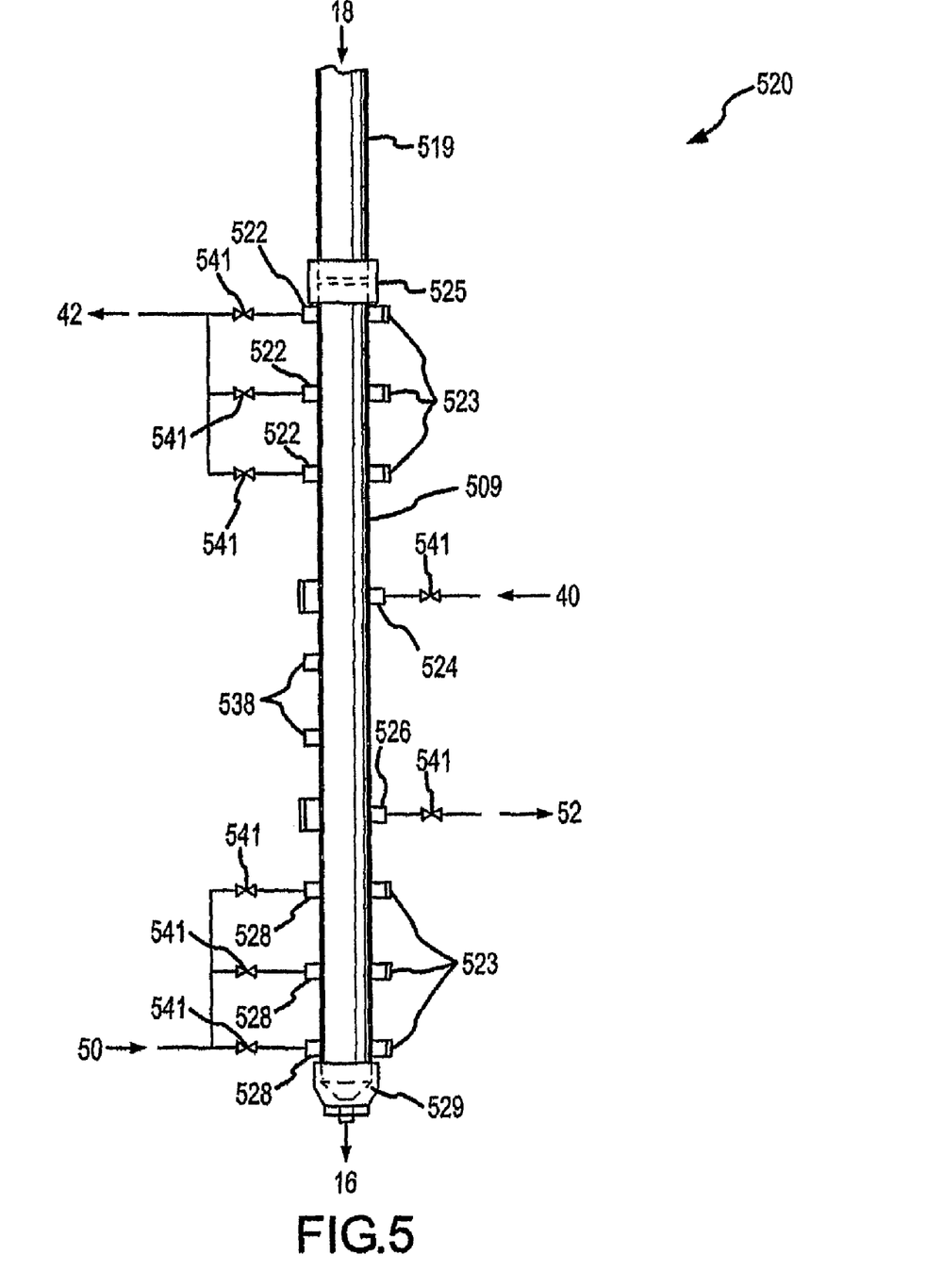
FIG. 5 is a cross-sectional, schematic view of one embodiment of a regeneration column.

One embodiment of a regeneration column having multiple inlet and outlets is illustrated in FIG. 5. The regeneration column 520 includes a tubular member 509, which is interconnected to solid spent media supply means 519 via coupling 525. The tubular member 509 is also interconnected to a solid spent media outlet 529, where solid reactive media 16 may exit regeneration column 520. A plurality of regeneration liquid outlet ports 522 are disposed proximal the top portion of tubular member 509. A regeneration liquid inlet port 524 is interconnected to the tubular member 509 below at least one of the plurality of regeneration liquid inlets 522. Sensor ports 538 are interconnected to tubular member 509 below regeneration liquid inlet port 524. A rinsing liquid outlet port 526 is interconnected to tubular member 509 below at least one of the sensor ports 538. A plurality of rinsing liquid inlet ports 528 are interconnected to tubular member 509, at least one of which is disposed below rinsing liquid outlet port 526. A valve 541 may be interconnected to each of the regeneration liquid outlet ports 522, the regeneration liquid inlet port 524, the rinsing liquid outlet port 526, and/or the plurality of rinsing liquid inlet ports 528, for assisting in controlling the flow of liquid into and out of tubular member 509. A plurality of maintenance ports 523 may be disposed at various locations along tubular member 509, such as proximal an inlet and/or outlet port of a liquid, to facilitate maintenance of column 520 (e.g., for sampling and/or placement of measurement devices).

Operation of regeneration column 520 is similar to the operation of regeneration column 20 of FIG. 1. Regeneration liquid 40 enters treatment column 520 via regeneration liquid inlet 524 and flows upwards (e.g., via pumping force) and exits regeneration column 520 via at least one of the spent regeneration liquid outlets 522 as spent regeneration liquid 42. Rinsing liquid 50 enters regeneration column 520 via at least one of the rinsing liquid inlets 528 and flows upwards (e.g., via pumping force) and exits regeneration column 520 via spent rinsing liquid outlet 526 as spent rinsing liquid 52. Solid spent media 18 enters regeneration column 520 via supply means 519 and solid spent media inlet port (not illustrated) and flows via gravity toward outlet 529 (i.e., countercurrent to the flow of the regeneration liquid and the rinsing liquid). Solid spent media 18 exits the regeneration column 520 via solid reactive media outlet 529 as solid reactive media 16. Solid spent media 18 will thus flow through two zones in a single column as described above, thereby both regenerating and rinsing the solid media in a single column.

Although FIG. 5 illustrates only a single regeneration liquid inlet 524 and a single rinsing liquid outlet 26, more than one regeneration liquid inlet 524 and rinsing liquid outlet 526 may be used. For example, a plurality of regeneration liquid inlets may be used, such as when it is desirable to inject a plurality of regeneration liquids to achieve a more consistent pH in the column. Likewise, regeneration liquid streams of differing quality may be injected at different locations in the column, such as to adjust the pH of the column and/or provide a pH gradient in the column. For example, the regenerating liquid and/or the rinsing liquid may be injected into the regeneration column 20 via multiple inlets and at differing times to achieve a concentration profile within the regeneration column so as to facilitate more efficient/effective regeneration and rinsing activity.

Figure 6A:
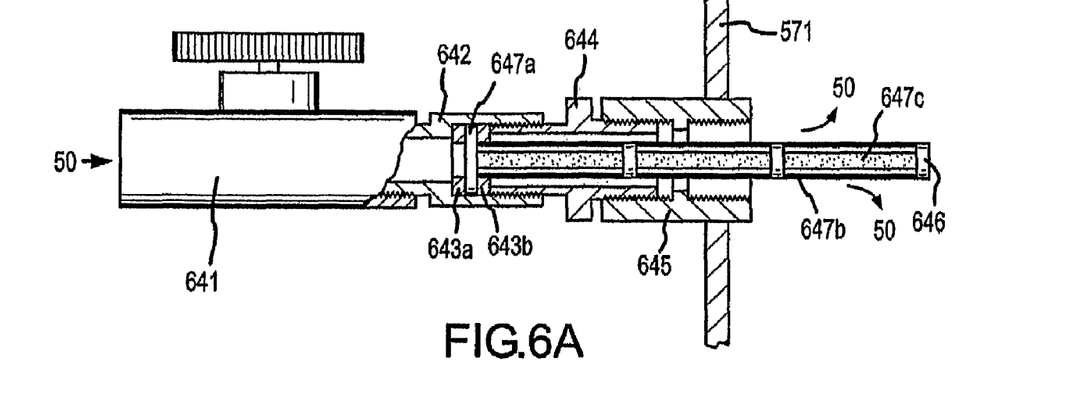
FIG. 6A is a partial cross-sectional view of one embodiment of a fluid inlet configuration useful with the regeneration column or treatment column.

As noted, rinsing liquid 50 is supplied to treatment column 520 via rinsing liquid inlet ports 528. It is desirable that the rinsing liquid inlet ports 528 are configured so that they do not significantly impede the flow of solid media through the treatment column 520 and further so that solid media does not clog such inlets. One embodiment of one useful rinsing liquid port configuration is illustrated in FIG. 6A. A valve 641 is interconnected to an adapter 642, such as via threads and corresponding grooves. The adapter 642 is interconnected to a first portion of a male adapter 644, such as via threads and corresponding grooves. A female coupling 645 is interconnected to a second portion of the male adapter 644, such as via threads and corresponding grooves. The female coupling 645 is further interconnected to a sidewall 571 of the regeneration column 520 (e.g., via a weld). A liquid discharge apparatus 646 is fluidly interconnected to the valve 641 to facilitate entry of rinsing liquid into the regeneration column.

More particularly, the liquid discharge apparatus 646 comprises a ring 647a fixedly interconnected to a tube 647b, which contains apertures (not illustrated). A screen mesh 647c is interconnected to and substantially circumscribes the outer surface of the tube 647b. The liquid discharge apparatus 646 is interconnected to the adapter 642 via washers 643a, 643b located on each side of ring 647a. Tube 647b is disposed within at least a portion of the adapter 642, the male fitting 644, and the female coupling 645. Tube 647b may also partially extend into the regeneration column 520.

In operation, rinsing liquid 50 enters valve 641, and flows through adapter 642, washer 643a and enters liquid discharge apparatus 646 via ring 647a. Rinsing liquid 50 continues through tube 647b and exits the tube 647b via the apertures and screen mesh 647c. The screen mesh 647c has pores sized to allow liquid to flow therethrough while restricting flow of large particles therethrough. Thus, flow of rinsing liquid 50 into the regeneration column 520 is facilitated and with restricted clogging of the rinsing liquid inlet by solid media.

Figure 6B:
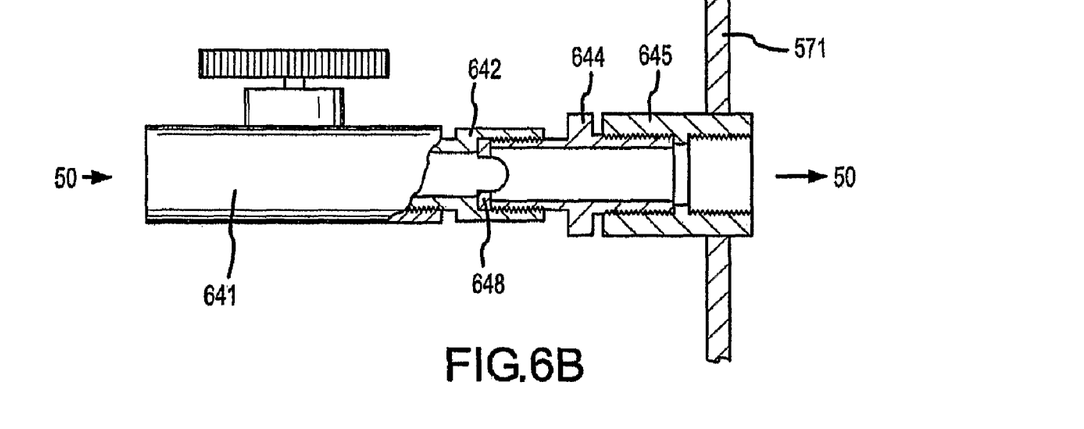
FIG. 6B is a partial cross-sectional view of another embodiment of a fluid inlet configuration useful with the regeneration column or treatment column.

Another embodiment of a rinsing liquid port configuration is illustrated in FIG. 6B. In this embodiment, the liquid discharge apparatus 646 of FIG. 6A has been replaced by a filter washer 648. The remaining components of the liquid port configuration are generally the same as described with reference to FIG. 6A. The filtered washer 648 can be any appropriate washer having pores that restrict flow of solids therethrough while permitting flow of liquids therethrough. In operation, liquid 50 flows through valve 641 and filtered washer 648 and into regeneration column 520 via connector 642, 644 and 645. Thus, flow of rinsing liquid 50 into the regeneration column 520 is facilitated and with restricted clogging of the rinsing liquid inlet by solid media.

Figure 6C:
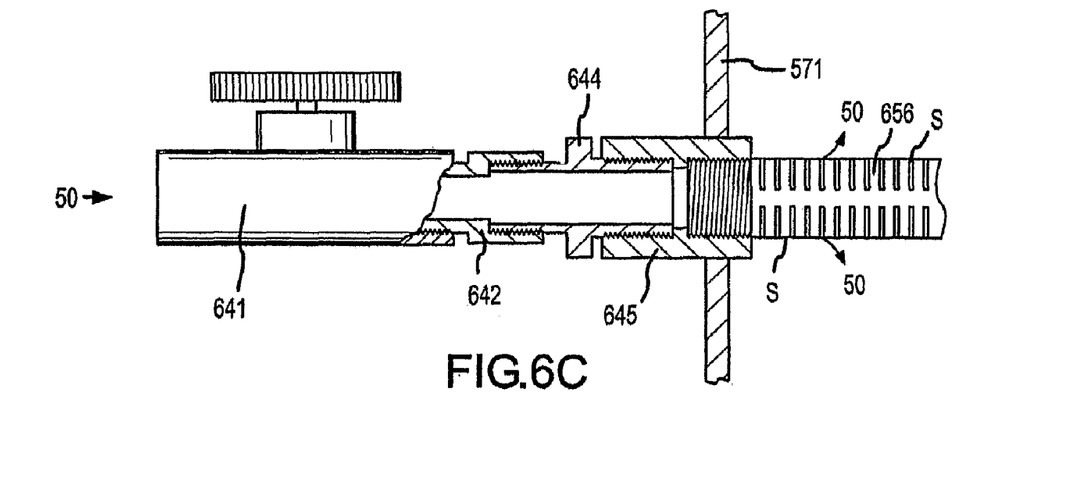
FIG. 6C is a partial cross-sectional view of yet another embodiment of a fluid inlet configuration useful with the regeneration column or treatment column.

Another embodiment of a rinsing liquid port configuration is illustrated in FIG. 6C. Similar to FIG. 6A, a valve 641 is interconnected to an adapter 642, which is interconnected to a male connector 644, which is interconnected to a female coupling 645. In this embodiment, the liquid discharge apparatus 646 of FIG. 6A has been replaced by a slotted pipe 656. The slotted pipe is interconnected to female coupling 645 (e.g., via matching grooves and threads). In operation, rinsing liquid 50 flows through valve 641 and into slotted pipe 656 via connectors 642, 644 and 645. Rinsing liquid flows into regeneration column 520 via the slots S in the slotted pipe 656. Slots S are sized such that liquid may flow therethrough, but large particles are restricted from flowing therethrough. Thus, flow of rinsing liquid 50 into the regeneration column 520 is facilitated and with restricted clogging of the rinsing liquid inlet by solid media.

As may be appreciated, any of the above-described rinsing liquid inlet configurations may also be used for the regeneration liquid inlet. Additionally, similar configurations may also be used for any of the liquid outlets. Moreover, any of the above-described rinsing liquid inlet configurations may be used in conjunction with the treatment column 10 (e.g., in conjunction with a contaminated liquid inlet).

Other configurations of the treatment system are contemplated and are within the scope of the present invention. For example, the treatment column 10 and the regeneration column 20 may be combined into a single column having three zones, with the contaminated liquid treatment zone being on top, the regeneration zone being in the middle and the rinsing zone being at the bottom. In this embodiment, regenerated resin is removed from the bottom of the column and is directly returned to the top of the column. A flow differential between two or more liquids may be utilized to restrict fluid of one zone from entering another zone. As may be appreciated, an entire column and various pumps could be eliminated with such a configuration, thereby potentially lower the capital and operating cost of the treatment system. In is anticipated that such a single column system would find utility in various applications, such as residential water softening applications and zero-discharge cooling tower applications.

Figure 7:
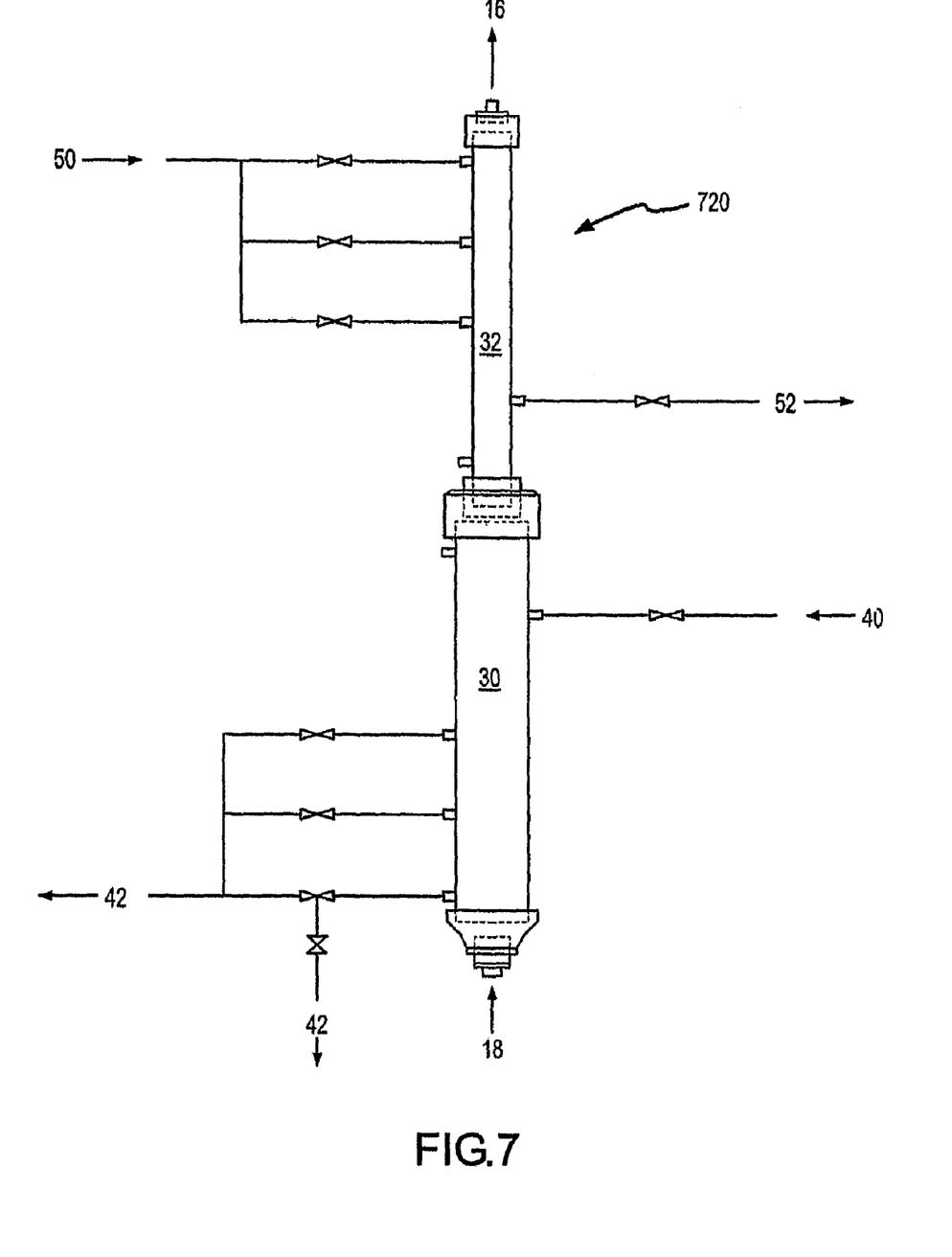
FIG. 7 is a schematic view of one embodiment of a regeneration and rinse column.

In another approach, the flows in the regeneration column may be inverted from that shown in FIG. 1, wherein the flow of the solid media is driven upward by a pumping force or air compression. One embodiment of such an approach is illustrated in FIG. 7 where the regeneration zone 32 and the rinsing zone 30 are inverted related to the regeneration column 20 of FIG. 1. Thus, the rinsing zone 30 is near the top of the regeneration column 720 and the regeneration zone 32 is near the bottom of the regeneration column 720. In this, and other embodiments, the size of the regeneration column 720 comprising the first zone 30 may be different than the size of the regeneration column comprising the second zone 32, so as to facilitate separation of the two zones and/or to provide suitable flow rates and residence times in each zone 30, 32.

Removal of contaminants from the contaminated liquid by the solid media has been described herein as occurring via adsorption. However, it will be appreciated that contaminants also may be absorbed into the solid reactive media. Thus, the use herein of the term "adsorb", "adsorbing" and the like is not meant to limit the method of contaminants removal, and the term adsorb should be construed broadly to include both adsorption and absorption processes.

carbon. In another arrangement, contaminants from one liquid stream could be adsorbed into another immiscible liquid stream, which could then be regenerated as described herein.

EXAMPLES

A liquid treatment system, similar to the liquid treatment system 1 of FIG. 1, was constructed. Contaminated water was treated in the treatment column with an ion exchange resin [TYPE?]. The spent ion exchange resin was regenerated in a regeneration column. Some results from the treatment process are provided in Table 1. Of note, the total amount of dissolved solids of in the contaminated water was reduced from 1320 to 90 ppm by the treatment system and the sodium level was reduced from 494 ppm to 29 ppm. Also of note, the treated water exiting the treatment column had a low pH and was thus post-treated with a basic solution to create a neutralized solution.

TABLE 1

| | Result | | | | |
|---|---|---|---|---|---|
| General Parameters | Contaminated Water | Treated Water | Spent Regen Liquid (Brine) | Neutralized Treated Water | Units |
| pH | 10.7 | 5.0 | ND | 6.9 | s.u. |
| Electrical Conductivity | 1970 | 146 | >200,000 | 775 | pmhos/cm |
| Total Dissolved Solids (180) | 1320 | 90 | 39500 | 470 | mg/L |
| Solids, Total Dissolved (Calc) | 1220 | 60 | 63200 | 450 | mg/L |
| Aridity, Total (as CaCO$_3$) | ND | ND | 42800 | ND | mg/L |
| Alkalinity, Total (as CaCO$_3$) | 1170 | 6 | ND | 396 | mg/L |
| Hardness, Calcium/Magnesium (as CaCO$_3$) | 18 | ND | 635 | 392 | mg/L |
| Nitrogen, Ammonia (As N) | 1.5 | ND | 34.3 | ND | mg/L |
| Sodium Adsorption Ratio | 51.4 | ND | 232 | 0.8 | |
| Anions | | | | | |
| Alkalinity, Bicarbonate as HCO3 | 1400 | 7 | ND | 484 | mg/L |
| Alkalinity, Carbonate as C03 | 13 | ND | ND | ND | mg/L |
| Alkalinity, Hydroxide as OH | ND | ND | ND | ND | mg/L |
| Chloride | 12 | 22 | 49400 | 15 | mg/L |
| Fluoride | 2.8 | 2.7 | ND | 2.7 | mg/L |
| Nitrogen, Nitrate-Nitrite (as N) | ND | ND | ND | 0.08 | mg/L |
| Sulfate | ND | 7 | 20 | 6 | mg/L |
| Cations | | | | | |
| Calcium | 4 | ND | 142 | 155 | mg/L |
| Magnesium | 2 | ND | 69 | 1 | mg/L |
| Potassium | 6 | ND | 156 | ND | mg/L |
| Sodium | 494 | 29 | 13400 | 38 | mg/L |
| Cation/Anion Balance | | | | | |
| Cation Sum | 22.00 | 1.24 | 1456.81 | 9.52 | mg/L |
| Anion Sum | 23.92 | 1.01 | 1393.84 | 8.62 | mg/L |
| Cation-Anion Balance | 4.18 | 0.23 | 2.20 | 4.93 | % |

It is contemplated that the present invention could be used with various countercurrent treatment schemes, aside from the solid-liquid countercurrent arrangement described above, such as solid-gas countercurrent arrangements, liquid-gas countercurrent arrangements and even liquid-liquid countercurrent arrangements. In this regard, activated carbons, ion exchange resins and other types of adsorptive type materials may be employed in any of these arrangements. For example, trace VOCs (volatile organic contaminants) could be removed various air streams using a solid adsorbent, such as activated The embodiments described above are for exemplary purposes only and are not intended to limit the scope of the present invention. Various adaptations, modifications and extensions will be apparent to those skilled in the art.

What is claimed is:

1. A system for continuously treating a contaminated fluid stream and for continuously regenerating a solid reactive media used in the treatment of the contaminated fluid stream, the system comprising:

a treatment column operable to continuously flow solid reactive media there through to treat a contaminated fluid stream, the treatment column having a solid reactive media inlet and a solid spent media outlet; and a regeneration column adapted to continuously receive solid spent media from the treatment column, the regeneration column comprising:
  a regeneration fluid outlet;
  a regeneration fluid inlet below the regeneration fluid outlet;
  a rinsing fluid outlet below the regeneration fluid inlet;
  a rinsing fluid inlet below the rinsing fluid outlet;
  a solid spent media inlet above the regeneration fluid inlet, the solid spent media inlet being connected in fluid communication with or interconnectable to the solid spent media outlet of the treatment column;
  a solid reactive media outlet below the solid spent media inlet, the solid reactive media outlet being connected in fluid communication with or interconnectable to the solid reactive media inlet of the treatment column; and
  a sensor proximal one of the regeneration fluid inlet and the rinsing fluid outlet, the sensor being adapted to sense a condition of fluid proximal the sensor.

2. The system of claim 1, wherein the regeneration column is oriented such that, during operation of the system, solid reactive media entering the regeneration column will flow from the solid spent media inlet downwards toward the solid reactive media outlet, wherein regeneration fluid entering the regeneration column will flow upward from the regeneration fluid inlet toward the regeneration fluid outlet, and wherein rinsing fluid entering the regeneration column will flow upwards from the rinsing fluid inlet toward the rinsing fluid outlet.

3. The system of claim 1, wherein the regeneration column is substantially vertically oriented.

4. The system of claim 1, wherein the regeneration column is configured to facilitate the substantially unobstructed flow of solid media through at least two zones of the regeneration column.

5. The system of claim 1, further comprising:
  a regeneration fluid supply connected in fluid communication with or interconnected to the regeneration fluid inlet, the regeneration fluid supply being operable to supply a regeneration fluid at a first flow rate;
  a rinsing fluid supply connected in fluid communication with or interconnected to the rinsing fluid inlet, the rinsing fluid supply being operable to supply a rinsing fluid at a second flow rate, wherein the differential between the first flow rate and second flow rate is such that the regeneration fluid and the rinsing fluid are restricted from substantially mixing.

6. The system of claim 1, wherein the sensor is adapted to sense the electroconductivity of fluid proximal the sensor.

7. The system of claim 1, further comprising:
  a controller connected in fluid communication with or interconnected to the sensor;
  a fluid flow rate adjuster connected in fluid communication with or interconnected to the controller, the controller being operable to receive signals from the sensor, and wherein the controller is further operable to send signals to the fluid flow rate adjuster to adjust a flow rate of a fluid associated with at least one of the regeneration liquid inlet, the regeneration liquid outlet, the rinsing liquid inlet and the rinsing liquid outlet.

8. The system of claim 1, wherein the solid reactive media comprises beads of ion exchange resin.

9. The system of claim 1, wherein the solid reactive media comprises beads of ion exchange resin.

10. A method for continuously treating a contaminated fluid stream while continuously regenerating a solid reactive media used in the treatment of the contaminated fluid stream, the method comprising:
  flowing, in a first treatment zone, a contaminated fluid stream countercurrent to flow of a stream of solid reactive media, thereby treating the contaminated fluid stream and producing solid spent media;
  flowing, in a second treatment zone, a regeneration fluid stream countercurrent to flow of a stream of the solid spent media, thereby producing solid regenerated media;
  flowing, in a third treatment zone, a rinsing fluid stream countercurrent to flow of a stream of solid regenerated media, thereby producing the solid reactive media; and
  returning the solid reactive media to the first treatment zone;
  monitoring a condition of fluid proximal the second and third treatment zones, wherein the condition is one of electroconductivity and pH; and
  completing a predetermined action in response to the monitoring step.

11. The method of claim 10, wherein the second treatment zone and the third treatment zone are contained in a single regeneration column, and wherein the method comprises:
  flowing solid spent media from the second zone to the third zones, wherein said second treatment zone is separated from the third treatment zone without the use of a physical barrier connected in fluid communication with or interconnected to the regeneration column.

12. The method of claim 10, wherein the second treatment zone is separated from the third treatment zone via a flow rate differential between a rate of flow of the regeneration fluid stream and a rate of flow of the rinsing fluid stream.

13. The method of claim 10, wherein, when the monitored condition is not in accordance with a predetermined control parameter, the completing step comprises:
  changing a least one of a flow rate associated with the regeneration fluid, a flow rate associated with the rinsing fluid, and combinations thereof.

14. The method of claim 10, wherein the first treatment zone is contained in a single column.

15. The method of claim 10, wherein each of the first, second and third treatment zones are contained in a single column.

16. The method of claim 10, wherein the first treatment zone is contained in a treatment column, separate from the regeneration column.

17. The method of claim 10, wherein the flowing, in a second treatment zone step comprises:
  flowing via gravity the spent reactive media through an upper portion of a regeneration column; and
  upwardly flowing the regeneration fluid stream through the upper portion of the regeneration column.

18. The method of claim 10, wherein the flowing, in a third treatment zone, step comprises:
  flowing via gravity the spent reactive media through a lower portion of the regeneration column; and
  upwardly flowing the regeneration fluid stream through the lower portion of the regeneration column.

19. The method of claim 10, wherein each of the flowing steps is completed contemporaneously and continuously.

20. A method for continuously treating a contaminated fluid stream while continuously regenerating a solid reactive media used in the treatment of the contaminated fluid stream, the method comprising:
- flowing, in a first treatment zone, a contaminated fluid stream countercurrent to flow of a stream of solid reactive media, thereby treating the contaminated fluid stream and producing solid spent media;
- flowing, in a second treatment zone, a regeneration fluid stream countercurrent to flow of a stream of the solid spent media, thereby producing solid regenerated media;
- flowing, in a third treatment zone, a rinsing fluid stream countercurrent to flow of a stream of solid regenerated media, thereby producing the solid reactive media;
- wherein at least one of the flowing steps is accomplished in a column operating at about atmospheric pressure; and
- returning the solid reactive media to the first treatment zone.

21. The method of claim 20, further comprising:
- supplying solid spent media to the second treatment zone; and
- passing the solid spent media through the second treatment zone via gravity.

22. The method of claim 21, wherein the supplying step comprises:
- dumping the solid spent media into the top of a regeneration column comprising the second treatment zone.

23. The method of claim 22, wherein the regeneration column comprises at least a partially open top portion, and wherein the dumping step comprises the solid spent media into the open top portion of the regeneration column.

24. The method of claims 22, wherein the regeneration column is operated at about atmospheric pressure.

25. The method of claims 10, further comprising:
- removing a slurry of fluid and solid spent media from the first treatment zone;
- separating a substantial portion of the fluid in the slurry from the solid spent media; and
- returning the separated fluid to the first treatment zone.

* * * * *